Dec. 28, 1943.   K. MAYBACH   2,337,910
TRANSMISSIONS FOR MOTOR VEHICLES
Filed Dec. 4, 1940

Inventor:
KARL MAYBACH
By Edmund F. Wang Jr.
ATTORNEY

Patented Dec. 28, 1943

2,337,910

UNITED STATES PATENT OFFICE 2,337,910

TRANSMISSION FOR MOTOR VEHICLES

Karl Maybach, Friedrichshafen-on-the-Bodensee, Germany; vested in the Alien Property Custodian Application December 4, 1940, Serial No. 368,540
In Germany December 5, 1939

2 Claims. (Cl. 105—96.2)

My invention relates to transmissions for motor vehicles and has special reference to transmissions including a hydraulic torque converter or a plurality of such converters. It is of special importance in heavy vehicles driven by internal combustion engines.

In transmissions of this kind it is desired to develop a high secondary turning moment for driving the vehicle wheels with the motor revolving at relatively low speeds, so as to get high tractive forces when starting. Under the circumstances extraordinary high stresses are likely to be created in the members of the transmission which may necessitate an increase in the dimensions of such members and thus make them extremely heavy; and because of the high tractive forces at the wheels of the vehicle the friction limit may even be exceeded if the motor speed is too high for favorable starting movement of the vehicle.

According to my invention these disadvantages are avoided by providing means preventing increase in the speed of the motor beyond a certain limited range for a short period when starting, for example for vehicle speeds up to three miles per hour. Consequently the value of the secondary turning moment developed by the torque converter is adequately limited and practically held constant over the afore-mentioned period and the stresses of the transmission elements remain within admissible limits.

For this purpose I prefer to provide a device which operates in dependence on the speed of the vehicle, that is in dependence on the revolutions of the out-going shaft of the hydraulic torque converter or of the shaft driving the wheels of the car.

All this will be understood best when having reference to the drawing which represents an example embodying my invention.

Figure 2:
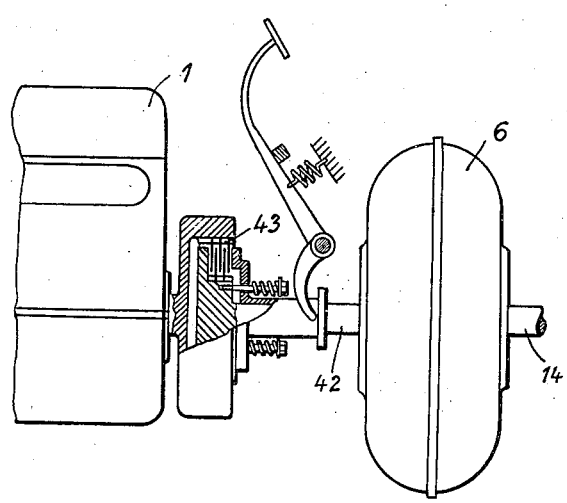
Fig. 2 is a like view of a modified construction different from Fig. 1.

The internal combustion engine 1 is provided with any normal fuel carburetor or equivalent fuel feeding device 2 adapted to be operated by means of a suitable actuating pedal or the like through fuel control lever 3, rod 4 and lost motion device 41, which may be made to work automatically in any well known manner (not illustrated). On the outgoing motor shaft 42 flywheel 5 is situated. There may as well be inserted a friction clutch 43, instead or in addition, as represented in Fig. 2. Shaft 42 then leads to a hydraulic torque converter 6 which on its out-going right hand side drives shaft 14. To this shaft 14 driving shaft 8 is flexibly connected by means of a universal joint 7. Shaft 8 at its right hand end is provided with bevelled gears for driving the axle 10 with vehicle traction wheel 11 thereon.

There is a pinion 12 rigidly connected to shaft 14 and in mesh with pinion 13 which has a driving connection with a centrifugal governor 15 adapted to act on piston 16 inside of cylinder 20 of a fluid control valve device against the pressure of compression spring 19. Piston 16 has a cross channel 17 and a longitudinal channel 18, this latter channel 18 connecting cross channel 17 to the space to the right of piston 16. An oil pump 40 driven by the engine 1 tends to supply oil under pressure through tube 21 which at 24 opens into control valve cylinder 20. Another opening 25 is situated close to opening 24, but the distance between these openings is so chosen that cross channel 17 in piston 16 may be either in connection with one or the other of these openings 24 and 25. From opening 25 the oil may escape outward by means of tube 22, as indicated by the arrow.

There is a third opening 26 in control valve cylinder 20 situated opposite to the upper end of cross channel 17, and connected to this opening is tube 23 leading to fluid motor cylinder 27 in which piston 28 is adapted to move under the oil pressure from the space 33 above the piston which connects with tube 23 against compression spring 29. A flange stop 30 or the like prevents piston 28 from being moved to the top of the cylinder 27. In the idling position, when there is no oil pressure inside of space 33, piston 28 is returned to its upper end position under the pressure of spring 29 and bears against this stop 30.

A rod 31 is in rigid connection with piston 28, and at its upper end it is provided with knob 32 or the like constituting an adjustable fuel controlling limit stop against which the right hand end of lever 3 may bear when this lever is operated by means of rod 4 after it has travelled over a certain way.

Figure 1:
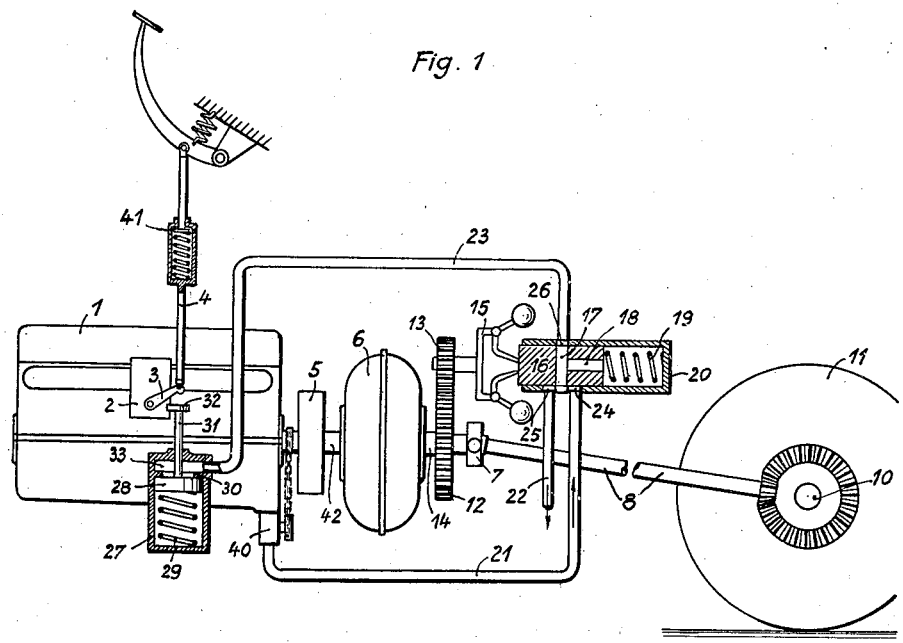
Fig. 1 is a diagrammatical side view, partly in section, of the driving machinery of a railroad motor car, some parts being shown on an enlarged scale.

The different parts of the device are in the positions represented in Fig. 1 when the engine 1 is not running. When the engine is started the fuel admission cannot be increased above a certain limit because fuel control lever 3 after moving a limited distance is stopped by engagement of its right hand end against knob 32. Thus the engine is prevented from developing its entire output when the car is started, but later on, when the number of revolutions of the driven shaft 14 increases as the car begins to move, the fuel control limit stop 32 is automatically adjusted downwardly and the carburetor is allowed to be opened to a greater extent to increase the fuel admission and the motor speed, in dependence on the speed of rotation of the driven shaft. As the speed of rotation of shaft 14 increases, pinions 12 and 13 cause centrifugal governor 15 to move piston 16 to the right, so that pressure oil from tube 21 may enter the valve device through cross channel 17 and longitudinal channel 18 into the space to the right of piston 16. But this increase in oil pressure causes piston 16 to be moved back again to its middle position shown in Fig. 1 to cut off tube 21 and open tube 23. Consequently, a certain increased oil pressure is established in channel 17 and transmitted through tube 23 to space 33 of cylinder 27 of the fuel control motor. This increased pressure causes piston 28 to move downward so that knob 32 also moves downward allowing for further movement of fuel control lever 3 which means an increase in fuel admission and in motor output. This again may cause another increase in car speed and consequent momentary actuation of valve piston 16 by the centrifugal governor and thus a further increase in oil pressure in space 33 of the fuel control motor with attendant further adjustment of limit stop 32 downwardly. Thus with progressive increases in the speed of shaft 14 at the output end of the torque converter 6 and the resultant increases in the vehicle speed, the fuel limit stop is adjusted downwardly with a step-by-step motion so that at last full opening of the carburetor is allowed.

While the car is at rest and during slow starting movement thereof up to a pre-determined speed limit, for instance 3 miles per hour, the turning moment transmitted to the vehicle wheels is practically held constant, whereas it is allowed to decrease in the normal manner, in accordance with the diagram of the relation between the secondary turning moment and the numbers of revolutions, which is well known.

Instead of making use of a fluid pressure device one may as well choose a mechanical, pneumatical or electrical device for permitting the carburetor to be opened to a certain extent only when starting. As the construction of such other devices appears to be within the knowledge of those skilled in the art after they have read my foregoing specification it is not deemed necessary to give special illustrations thereof.

It is well known to provide vehicle speed responsive controls operating through the motor fuel feeding device when the vehicle attains a certain maximum speed to prevent further increases in the speed of the motor and the vehicle. Such prior devices are readily distinguishable from the present invention broadly in that they do not control the motor speed when the vehicle is at rest and starting into motion. Further the prior control devices do not purport to control the rate of increase in the motor speed, the motor accelerating rate, but only come into operation after the motor is revolving at a speed at which the drive through the transmission produces the maximum vehicle speed desired.

I do not want to be limited to the details described or shown in the drawing as many variations may occur to those skilled in the art without deviating from the scope of my invention.

What I claim is:

1. In a motor car in combination an internal combustion engine, a speed and force transmission including a hydraulic torque converter, and means for limiting the speed of said engine during starting movement of the car, said means comprising a centrifugal governor rotating in dependence on the speed of the car, a fluid pressure valve operated by said governor between open and closed positions, and occupying one of said positions at low starting speed of the car and being shifted by said governor to its other position when the car reaches a predetermined higher speed, a fuel feeding device for the engine having an operating lever, a stop for limiting the extent of movement of said operating lever, and a fluid pressure device for adjusting the position of said stop in accordance with opening and closing of the fluid pressure controlled by said fluid pressure valve.

2. In a vehicle having an internal combustion engine, transmission mechanism for driving the vehicle from said engine, fuel feeding means for controlling the speed of the engine including an operating lever, and means for automatically limiting the speed of the engine during starting movements of the vehicle comprising a governor actuated from said transmission mechanism and fluid-pressure control means for limiting the extent of movement of said operating lever, said control means including a fluid receiving cylinder mounted adjacent said operating lever, a spring-pressed piston within said cylinder and carrying a stop member normally extended into position to narrowly restrict the movement of said operating lever, a normally closed valve arranged to be moved to open position by said governor, a fluid pump driven by said engine, and fluid conduits on opposite sides of said valve for connecting said pump with said cylinder to convey fluid under pressure into said cylinder when said valve is open to thereby adjust the position of the piston to permit increased extent of movement of said operating lever.

KARL MAYBACH.